US009572068B2

(12) United States Patent  
Aryafar et al.

(10) Patent No.: US 9,572,068 B2  
(45) Date of Patent: Feb. 14, 2017

(54) SYSTEMS AND METHODS FOR RATE ADAPTATION IN FULL-DUPLEX WIRELESS COMMUNICATION

(71) Applicant: Intel Corporation, Santa Clara, CA (US)

(72) Inventors: Ehsan Aryafar, Kensington, CA (US); Yang-Seok Choi, Portland, OR (US); Minyoung Park, Portland, OR (US); Shilpa Talwar, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 132 days.

(21) Appl. No.: 14/491,224

(22) Filed: Sep. 19, 2014

(65) Prior Publication Data

US 2015/0181458 A1 Jun. 25, 2015

Related U.S. Application Data

(60) Provisional application No. 61/911,074, filed on Dec. 3, 2013.

(51) Int. Cl.
*H04L 12/26* (2006.01)
*H04W 28/02* (2009.01)
(Continued)

(52) U.S. Cl.
CPC ........ *H04W 28/0252* (2013.01); *H04L 1/0003* (2013.01); *H04L 5/0057* (2013.01);
(Continued)

(58) Field of Classification Search
CPC ............. H04W 28/0236; H04W 84/12; H04W 72/0406; H04W 72/0413; H04W 72/042; H04W 28/18; H04W 28/22; H04W 28/20; H04L 5/14; H04L 25/0202; H04L 25/0224; H04B 41/083
See application file for complete search history.

(56) References Cited

U.S. PATENT DOCUMENTS 7,164,649 B2 * 1/2007 Walton .................. H04L 1/0002  
370/203  
8,873,496 B2 * 10/2014 Moulsley ............... H04B 7/024  
370/329

(Continued)

OTHER PUBLICATIONS

Bicket, John C., "Bit-rate Selection in Wireless Networks", Feb. 2005, 50 pages.

(Continued)

*Primary Examiner* — Brian O'Connor  
(74) *Attorney, Agent, or Firm* — Sutherland Asbill & Brennan LLP

(57) ABSTRACT

This disclosure describes systems, methods, and computer-readable media related to employing rate adaptation in full-duplex communication. A first computing device may establish with a second computing device a full-duplex communication channel having a forward data transmission direction and a reverse data transmission direction. The first computing device may transmit to the second computing device a first data portion in the forward data transmission direction of the full-duplex communication channel at a default data transmission rate. The first computing device may receive a second data portion in the reverse direction of the full-duplex communication channel containing a forward channel quality information (CQI) associated with the forward data transmission direction. The first computing device may transmit a third data portion at a first data transmission rate, wherein the first data transmission rate is based at least in part on the forward CQI contained in the second data portion.

21 Claims, 7 Drawing Sheets

(51) Int. Cl.
    *H04L 5/14*     (2006.01)
    *H04L 1/00*     (2006.01)
    *H04L 5/00*     (2006.01)
    *H04L 12/811*     (2013.01)

(52) U.S. Cl.
    CPC ................ *H04L 5/14* (2013.01); *H04L 47/38* (2013.01); *H04W 28/0236* (2013.01)

(56) References Cited

U.S. PATENT DOCUMENTS

| | | | | |
|---|---|---|---|---|
| 8,902,764 | B2* | 12/2014 | Imai | H04B 7/2615 370/252 |
| 9,100,964 | B2* | 8/2015 | Fong | H04W 72/02 |
| 9,155,077 | B2* | 10/2015 | Song | H04L 1/00 |
| 9,236,986 | B2* | 1/2016 | Park | H04L 5/0044 |
| 2007/0064823 | A1* | 3/2007 | Hwang | H04B 7/0413 375/260 |
| 2010/0315962 | A1* | 12/2010 | Imai | H04B 7/2615 370/252 |
| 2011/0134836 | A1* | 6/2011 | Lin | H04W 76/02 370/328 |
| 2012/0207038 | A1* | 8/2012 | Choi | H04W 16/14 370/252 |
| 2014/0092785 | A1* | 4/2014 | Song | H04L 1/00 370/280 |
| 2014/0092823 | A1* | 4/2014 | Song | H04L 1/00 370/329 |
| 2014/0362695 | A1* | 12/2014 | Ho | H04L 47/225 370/230 |

OTHER PUBLICATIONS

Chen et al., "Rate-Adaptive Framing for Interfered Wireless Networks", INFOCOM 2007. 26th IEEE International Conference on Computer Communications, IEEE, May 6-12, 2007, pp. 1325-1333.
Holland et al., "A Rate-Adaptive MAC Protocol for Multi-Hop Wireless Networks", Jul. 2001, 15 pages.
Kamerman et al., "WaveLAN® -II: A high-performance wireless LAN for the unlicensed band", Bell Labs Technical Journal, vol. 2 Issue:3, 1997, pp. 118-133.
Lacage et al., "IEEE 802.11 Rate Adaptation: A Practical Approach", Oct. 4-6, 2004, 9 pages.
Sadeghi et al., "Opportunistic Media Access for Multirate Ad Hoc Networks", Sep. 23-26, 2002, 12 pages.
Wong et al., "Robust Rate Adaptation for 802.11 Wireless Networks", Sep. 23-26, 2006, 12 pages.
Zhang et al., "A Practical SNR—Guided Rate Adaptation", the 27th Conference on Computer Communications, INFOCOM 2008, IEEE, Apr. 13-18, 2008, 1 page of Abstract only.

* cited by examiner

FIG. 5

| Frame Control | Duration/ ID | Address 1 | Address 2 | Address 3 | Sequence Control | Address 4 | QoS Control | HT Control |

MAC Header

FIG. 5(a)

| Frame Control | Address 1 | Address 2 | Address 3 | Sequence Control | Address 4 | QoS Control | HT Control | Duration/ ID | RVS CQI | MCS |

Modified MAC Header

FIG. 5(b)

SYSTEMS AND METHODS FOR RATE ADAPTATION IN FULL-DUPLEX WIRELESS COMMUNICATION

CROSS REFERENCE TO RELATED APPLICATIONS

This application claims the priority benefit of U.S. Provisional Application No. 61/911,074, entitled "Rate Adaptation in Full-duplex Wireless LANs," filed Dec. 3, 2013, which content is incorporated by reference in its entirety.

TECHNICAL FIELD

This disclosure generally relates to systems and methods for wireless communications and, more particularly, to full-duplex wireless communications systems.

BACKGROUND

Advances in wireless communications permitted users to connect in environments that typical wired systems could not work. However, wireless channel conditions may be susceptible to interference. Objects in the path of wireless signals may cause such interference. Wireless techniques, such as transmission rate adaptation have been imposed to improve the user experience. Transmitters and receivers may use rate adaptation techniques to send and receive wireless signals at variable rates. The typical approach to rate adaptation is to track channel conditions based on packet losses and to adapt the rates accordingly. However, tracking channel conditions based on packet losses can result in many unsuccessful transmissions when users are mobile, which may degrade performance and lower the user experience.

BRIEF DESCRIPTION OF THE FIGURES

Reference will now be made to the accompanying drawings, which are not necessarily drawn to scale, and wherein:

FIG. 5(a) is an illustrative Media Access Control (MAC) header in accordance with certain example embodiments of the disclosure.

FIG. 5(b) is an alternative MAC header in accordance with certain example embodiments of the disclosure.

DETAILED DESCRIPTION OF EMBODIMENTS OF THE DISCLOSURE

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Figure 1:
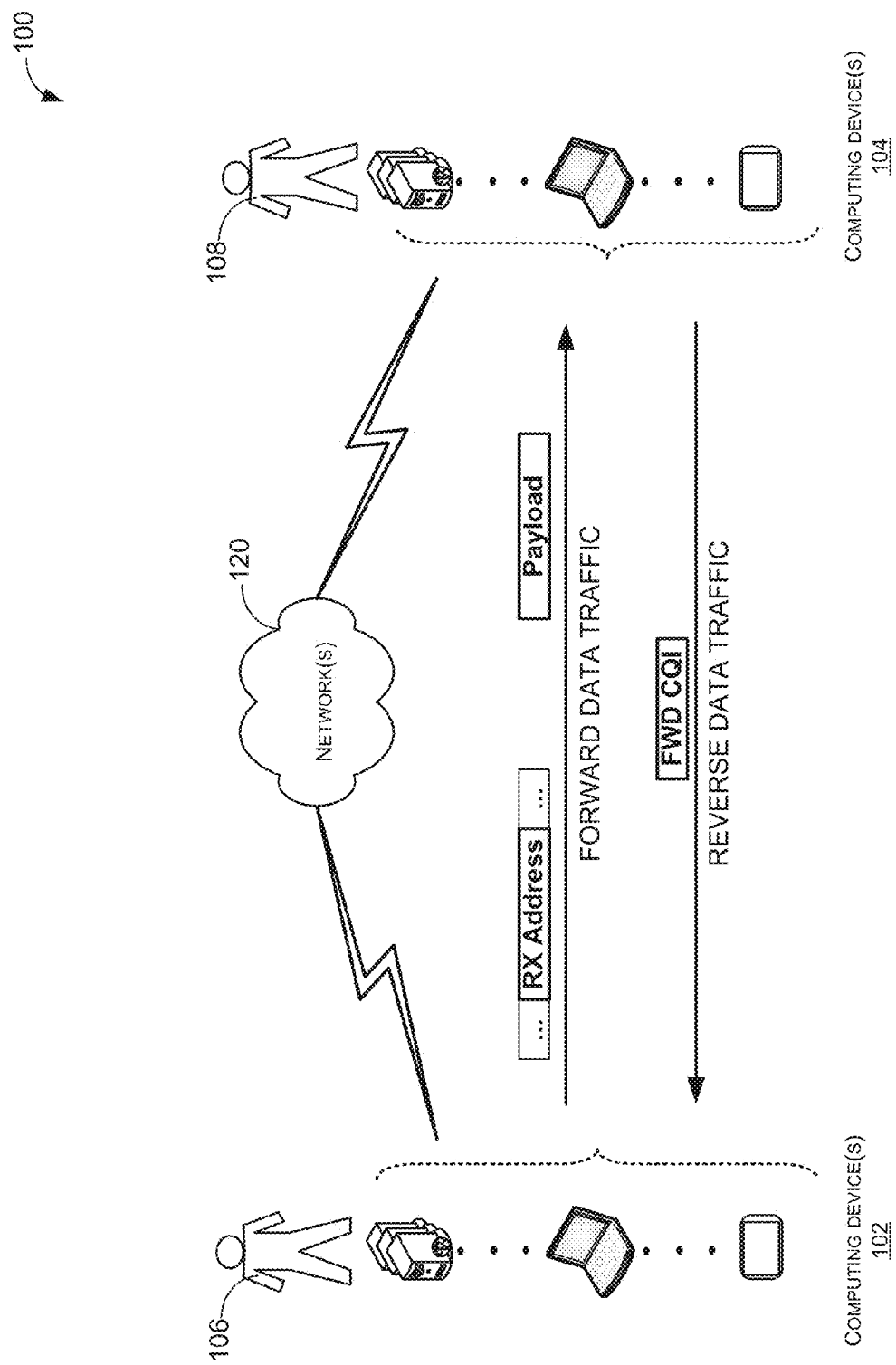
FIG. 1 is an illustrative data flow between components of an illustrative system architecture for a rate adaptation in full-duplex wireless communications in accordance with one or more embodiments of the disclosure.

FIG. 1 depicts an illustrative data flow between components of an illustrative rate adaptation system 100 for a rate adaptation in a full-duplex wireless network in accordance with one or more embodiments of the disclosure.

One or more illustrative computing devices (e.g., computing device 102 and 104) operable by one or more users (e.g., users 106 and 108) are depicted in FIG. 1. The computing devices may include any suitable processor-driven computing device including, but not limited to, a desktop computing device, a laptop computing device, a server, a router, a switch, an access point, a smartphone, a tablet, wearable wireless device (e.g., bracelet, watch, glasses, ring, etc.) and so forth. For ease of explanation, the computing devices (e.g., computing devices 102 and 104) may be described herein in the singular (e.g., computing device 102); however, it should be appreciated that multiple computing devices may be provided.

Any of the computing devices (e.g., computing devices 102 and/or 104) may be configured to communicate with each other and any other component of the system architecture 100 via one or more communications networks (e.g., network 120). Any of the communications networks may include, but not limited to, any one or a combination of different types of suitable communications networks such as, for example, cable networks, public networks (e.g., the Internet), private networks, wireless networks, cellular networks, or any other suitable private and/or public networks. Further, any of the communications networks (e.g., network 120) may have any suitable communication range associated therewith and may include, for example, global networks (e.g., the Internet), metropolitan area networks (MANs), wide area networks (WANs), local area networks (LANs), or personal area networks (PANs). In addition, any of the communications networks (e.g., network 120) may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Any of the computing devices (e.g., computing devices 102 and/or 104) may include one or more communications antennae. Communications antenna may be any suitable type of antenna corresponding to the communications protocols used by the computing devices (e.g., computing devices 102 and/or 104). Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the computing devices (e.g., computing devices 102 and 104).

Any of the computing devices (e.g., computing devices 102 and/or 104) may include any suitable radio and/or transceiver for transmitting and/or receiving radio frequency (RF) signals in the bandwidth and/or channels corresponding to the communications protocols utilized by any of the computing devices (e.g., computing devices 102 and/or 104) to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Computing devices (e.g., computing devices 102 and/or 104) may communicate with each other using full-duplex wireless communication. In a full-duplex communication, both computing devices (e.g., computing devices 102 and 104) may communicate with each other simultaneously. Full-duplex communication enables a device to send and receive packets at the same time and on the same frequency band. This type of communication may be achievable by having a channel that may operate in a two-way communication between two devices.

Computing devices (e.g., computing devices 102 and 104) may communicate with each other using one or more messages. The messages may be in the form of packets containing one or more data portions, which may be control data portions and/or user data portions. A message may comprise, at least in part, one or more headers that may refer to supplemental data (e.g., control data) placed at the beginning of a block of data being transmitted. A data portion that may be referred to as payload or body may follow the header. A header may contain identify information as far as an origin, destination or other network identification information. The payload may contain the user data being transmitted. Typically, a physical layer (PHY) header and/or a media access control (MAC) header may be part a message and/or packet.

In example embodiments, the header may be a PHY header and/or a MAC header. A PHY header and/or a MAC header may be data fields added at the beginning of a payload to be transmitted. Typically, a packet may have a PHY header followed by a MAC header followed by a payload. In some example embodiments, the MAC header information, among other things, may be used to identify a computing device (e.g., computing device 104) as the intended recipient of sent messages.

Dynamic conditions present in wireless channels may increase/decrease signal quality, thereby increasing/decreasing the usable data transmission rate by a wireless transmitter. In order to achieve the highest throughput, the data transmission rate or modulation and coding scheme (MCS) resulting in the highest throughput may be selected. It is understood that MCS may be an index value that may represent various modulation types and data transmission rates. In an example wireless standard, the IEEE 802.11 standards may support multiple data transmission rates, from eight or more data transmission rates in 802.11a/g to twenty or more data transmission rates in 802.11n. A transmitter operating under such wireless standard may then adapt its data transmission rate based on channel conditions.

In the illustrative example of FIG. 1, any of computing device(s) 102 may communicate with any of computing device(s) 104 through network 120 in full-duplex. The full-duplex communication between computing device 102 and computing device 104 may have a forward data traffic direction and a reverse data traffic direction. For example, computing device 102 may send one or more messages to computing device 104. One or more messages sent from computing device 102 to computing device 104 may contain a PHY and/or a MAC header followed by a payload in the forward data traffic. The PHY and/or MAC headers may contain a destination address. For example, the PHY and/or MAC headers may contain the address of the computing device that the message is intended for (e.g., computing device 104).

In one embodiment, the MAC header may contain the receiver address (e.g., computing device 104 address), which may be designated as the "RX address" as shown in FIG. 1. The computing device 104 may receive the RX address contained in the MAC header of a message from computing device 102 to computing device 104. The computing device 104 may determine using the RX address that it is the destination of the one or more data portions of the packetsin the forward data traffic sent from computing device 102. Computing device 104 may then determine a channel quality information (CQI) of the one or more data portions of the packetsin the forward data traffic. It is understood that CQI is a measure of channel quality and can potentially include signal-to-noise ratio, received signal strength at the receiver (e.g., computing device 104), or the highest rate at which the receiver may correctly decode the one or more data portions of the packets.

In one embodiment, the computing device 104 may send the CQI of the forward data traffic to the computing device 102. For example, the CQI may be sent in the reverse data traffic direction and may be referred to as forward CQI or FWD CQI. Once the computing device 102 receives the forward CQI, the computing device 102 may adjust the data transmission rate by selecting an MCS value based on the received forward CQI for subsequently transmitted one or more data portions of the packets. The MCS value may be based on transmission environment. Typically, the CQI is a measure of channel quality at the receiver of data portions. For example, a receiver may measure CQI by measuring noise, signal strength and interference at its location. Further, the ratio of the power between these measurements is referred to as SINR (Signal to Interference plus Noise Ratio) which is an example of CQI. The optimal MCS may depend on SINR and may also depend on the hardware. A wireless receiver or transmitter may include a table that maps SINR to MCS. Further, transmission rate is dependent on MCS and bandwidth of operation. For example, a known MCS and a known bandwidth of operation may result in a determination of the transmission rate.

The MCS and/or the data transmission rate of subsequently sent data portions may be adopted by the transmitter (e.g., computing device 102) according to variations in the transmission environment to maintain relatively optimal transmission throughput.

Figure 2:
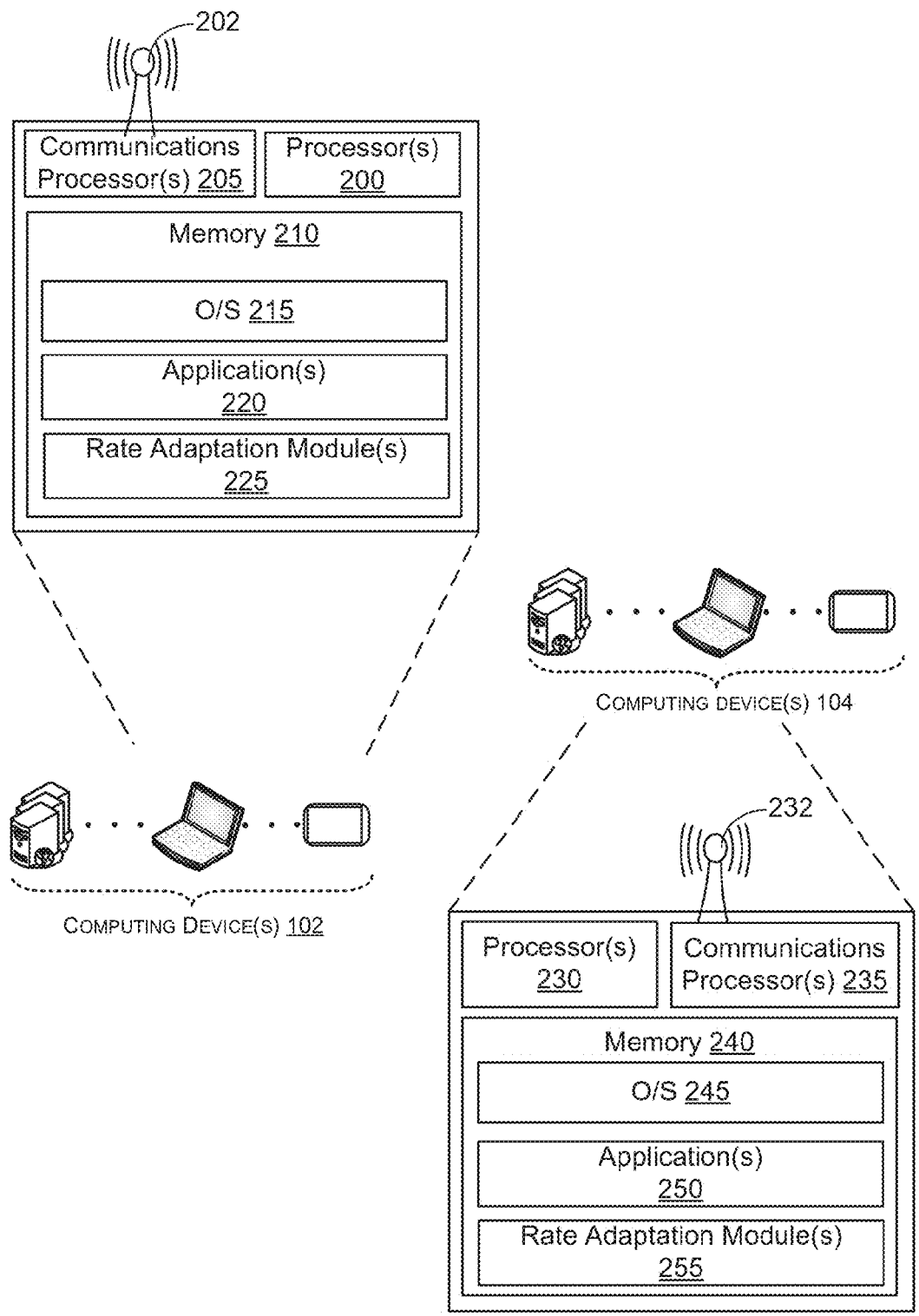
FIG. 2 is a block diagram including various hardware and software components of the illustrative system architecture depicted in FIG. 1 in accordance with one or more embodiments of the disclosure.

Referring now to FIG. 2, a simplified block diagram illustrating elements of the example computing devices 102 and 104 of FIG. 1 that can share capability via the communicative connection 120 in accordance with illustrative embodiments of the disclosure is discussed.

The computing device 102 may include one or more processors 200, one or more communications processors 205, one or more antennas 202, and/or one or more memories 210. As depicted herein, the processors 200 may be configured to operate instructions, applications, and/or software associated with services provided by the computing device 102. These instructions, applications, and/or software may be stored on the memory 210, depicted as one or more operating systems (O/S) 215 and/or one or more applications 220, and may be retrievable and executable by the processors 200. Alternatively, the instructions, applications, and/or software executed by the processors 200 may be stored in any suitable location, such as the cloud or other remote locations. The instructions, applications, and/or software modules, such as O/S 215 and/or application 220 may or may not correspond to physical locations and/or addresses in the memory 210. In other words, the contents of each of the modules may not be segregated from each other and may, in fact, be stored in at least partially interleaved positions on the memory 210.

The processor(s) 200 may include, without limitation, a central processing unit (CPU), a digital signal processor (DSP), a reduced instruction set computer (RISC), a complex instruction set computer (CISC), or any combination thereof. The computing device 102 may also include a chipset (not shown) for controlling communications between the processor(s) 200 and one or more of the other components of the computing device 102. In one embodiment, the computing device 102 may be based on an Intel® Architecture system, and the processor(s) 200 and the chipset may be from a family of Intel® processors and chipsets, such as the Intel® Atom® processor family. The processor(s) 200 may also include one or more processors as part of one or more application-specific integrated circuits (ASICs) or application-specific standard products (ASSPs) for handling specific data processing functions or tasks.

The one or more antenna(s) 202 may be any suitable antenna for wireless communications. The antennas 202 may be directional or omni-directional. In certain embodiments, the antenna may be a patch antenna. In some cases, the antenna 202 may be integrated with one of the communications processors 205, the processors 200, or any other elements of the computing device 102.

The communications processor(s) 205 may be configured to communicate with the processors 200 or other elements of the computing device 102 to transmit and/or receive communications signals, such as from the computing device 104 via any suitable communications mechanism, link, channel, or standard. The communications processor 205 may be configured to receive a communications signal and appropriately modulate, or otherwise transform the signal and provide the signal to the antenna 202 for transmission via wireless channels, such as Wi-Fi. The communications processors 205 may further be configured to receive communications signals from the antenna 202 and demodulate, or otherwise transform, the received signals, and provide the transformed signals to the processors 200 for further processing and/or storage. In certain aspects, the communications processors 205 may enable communications using a variety of modulation schemes, standards, and channels. In some cases, the communications processors 205 may be a separate element from the processors 200 and, in other cases, the communications processors 205 may be integrated with the processors 200.

The memory 210 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The O/S 215 may be configured to enable the operation of the one or more applications 220 on the processors 200. In one aspect, the O/S 215 may provide a common interface for the application 220 to interface with, utilize, and/or control the various hardware elements of the computing device 102. The details of operating systems are well-known and will not be discussed in significant detail herein. Example operating systems may include, but are not limited to, Google® Android®, Apple® iOS®, Microsoft® Windows Mobile®, Microsoft® Windows 7®, or the like. In certain aspects, such as in the context of providing sharing capability across computing devices 102, 104, such as via a network, the O/S 215 may provide functionality and enable the sharing of capability. In certain embodiments, the O/S 215 may provide capability sharing services to the application 220.

The O/S 215 may be configured to enable the operation of the one or more rate adaptation modules 225 on the processors 200 and/or communications processors 205 of the computing device 102.

The rate adaptation modules 225 may be configured to send data at a default data transmission rate from computing device 102 to computing device 104. The default data transmission rate may be set automatically by the system or may be set by the administrator of the system or by a user on the system. It is understood that the default data transmission rate may follow communications standards, such as IEEE 802.11, including its various versions (e.g. IEEE 802.11a/g or 802.11n, etc.).

During data transmission from a transmitter (e.g., computing device 102) to a receiver (e.g., computing device 104) in the forward data traffic direction, one or more headers of the one or more messages being transmitted may contain identifying information of the intended recipient of the one or more messages. The identifying information of the recipient may be in the form of an address (e.g., Address field in a MAC header). For example, the RX address in FIG. 1 may identify that the computing device 104 is the recipient of the one or more messages.

The rate adaptation modules 225 may be configured to adjust the data transmission rate (e.g., the default rate) to a data transmission rate more suitable to the channel condition between computing device 102 and computing device 104. The data transmission rate may be associated with an MCS value that may be based on a received CQI value. For example, computing device 102 may select an MCS value based on the received forward CQI. The MCS value may be selected to achieve a relatively optimal data throughput based on the received forward CQI, where the MCS value may be used for subsequently transmitted data portions from computing device 102.

Further, the transmitter (e.g., computing device 102) may receive data from the receiver (e.g., computing device 104) and may determine the quality of that data. The transmitter (e.g., computing device 102) may then provide a reverse CQI to enable the receiver to determine a MCS value to establish and optimal data transmission rate of the reverse data traffic.

Still referring to FIG. 2, the computing device 104 may include one or more processors 230, one or more communications processors 235, one or more antennas 232, and/or one or more memories 240. As depicted herein, the processors 230 may be configured to operate instructions, applications, and/or software associated with services provided by the computing device 104. These instructions, applications, and/or software may be stored on the memory 240, depicted as one or more operating systems (O/S) 245 and/or one or more applications 250, and may be retrievable and executable by the processors 230. Alternatively, the instructions, applications, and/or software executed by the processors 230 may be stored in any suitable location, such as the cloud or other remote locations. The instructions, applications, and/or software modules, such as O/S 245 and/or application 250 may or may not correspond to physical locations and/or addresses in the memory 240. In other words, the contents of each of the modules may not be segregated from each other and may, in fact, be stored in at least partially interleaved positions on the memory 240.

The processor(s) 230 may include, without limitation, a central processing unit (CPU), a digital signal processor (DSP), a reduced instruction set computer (RISC), a complex instruction set computer (CISC), or any combination thereof. The computing device 104 may also include a chipset (not shown) for controlling communications between the processor(s) 230 and one or more of the other components of the computing device 104. In one embodiment, the computing device 104 may be based on an Intel® Architecture system, and the processor(s) 230 and the chipset may be from a family of Intel® processors and chipsets, such as the Intel® Atom® processor family. The processor(s) 230 may also include one or more processors as part of one or more application-specific integrated circuits (ASICs) or application-specific standard products (ASSPs) for handling specific data processing functions or tasks.

The one or more antenna(s) 232 may be any suitable antenna for wireless communications. The antennas 232 may be directional or omni-directional. In certain embodiments, the antenna may be a patch antenna. In some cases, the antenna 232 may be integrated with one of the communications processors 235, the processors 230, or any other elements of the computing device 104.

The communications processor(s) 235 may be configured to communicate with the processors 230 or other elements of the computing device 102 to transmit and/or receive communications signals, such as from the computing device 104 via any suitable communications mechanism, link, channel, or standard. The communications processor 235 may be configured to receive a communications signal and appropriately modulate, or otherwise transform the signal and provide the signal to the antenna 232 for transmission via wireless channels, such as Wi-Fi. The communications processors 235 may further be configured to receive communications signals from the antenna 232 and demodulate, or otherwise transform, the received signals, and provide the transformed signals to the processors 230 for further processing and/or storage. In certain aspects, the communications processors 235 may enable communications using a variety of modulation schemes, standards, and channels. In some cases, the communications processors 235 may be a separate element from the processors 230 and, in other cases, the communications processors 235 may be integrated with the processors 230.

The memory 240 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The O/S 245 may be configured to enable the operation of the one or more applications 250 on the processors 230. In one aspect, the O/S 245 may provide a common interface for the application 250 to interface with, utilize, and/or control the various hardware elements of the computing device 102. The details of operating systems are well-known and will not be discussed in significant detail herein. Example operating systems may include, but are not limited to, Google® Android®, Apple® iOS®, Microsoft® Windows Mobile®, Microsoft® Windows 7®, or the like. In certain aspects, such as in the context of providing sharing capability across computing devices 102, 104, such as via a network, the O/S 245 may provide functionality and enable the sharing of capability. In certain embodiments, the O/S 245 may provide capability sharing services to the application 250.

The O/S 245 may be configured to enable the operation of the one or more rate adaptation modules 255 on the processors 230 and/or communications processors 235 of the computing device 104.

The rate adaptation module 255 may receive identification information in one or more messages. For example, the rate adaptation modules 255 may receive a receiver address (e.g., RX address) of the computing device 104, which may identify that the computing device 104 may be the recipient of the one or more messages.

The rate adaptation module 255 may generate a forward CQI, which determines the CQI of the channel where the transmitter sent the one or more messages (e.g., computing device 102) to the receiver (e.g., computing device 104). The rate adaptation module 255 may send the forward CQI to the transmitter of the one or more messages (e.g., computing device 102).

The rate adaptation modules 255 may be configured to send data at a default data transmission rate from computing device 104 to computing device 102 in the reverse traffic direction. The default data transmission rate may be set automatically by the system or may be set by the administrator of the system or by a user on the system. It is understood that the default data transmission rate may follow communications standards, such as IEEE 802.11 and that various provisions (e.g. IEEE 802.11a/g or 802.11n, etc.).

Additionally/alternatively, the receiver (e.g., computing device 104) may receive from the transmitter (e.g., computing device 102) a reverse CQI, which may assist the receiver in adapting its MCS value and selecting a respective data transmission rate based on the received reverse CQI.

The rate adaptation module 255 may select an MCS value that may correspond to a data transmission rate based on the reverse CQI received from the transmitter (e.g., computing device 102). Any following data portions and/or packets and/or messages from the receiver (e.g., computing device 104) may be sent using the selected MCS value, and/or data transmission rate.

Figure 3:
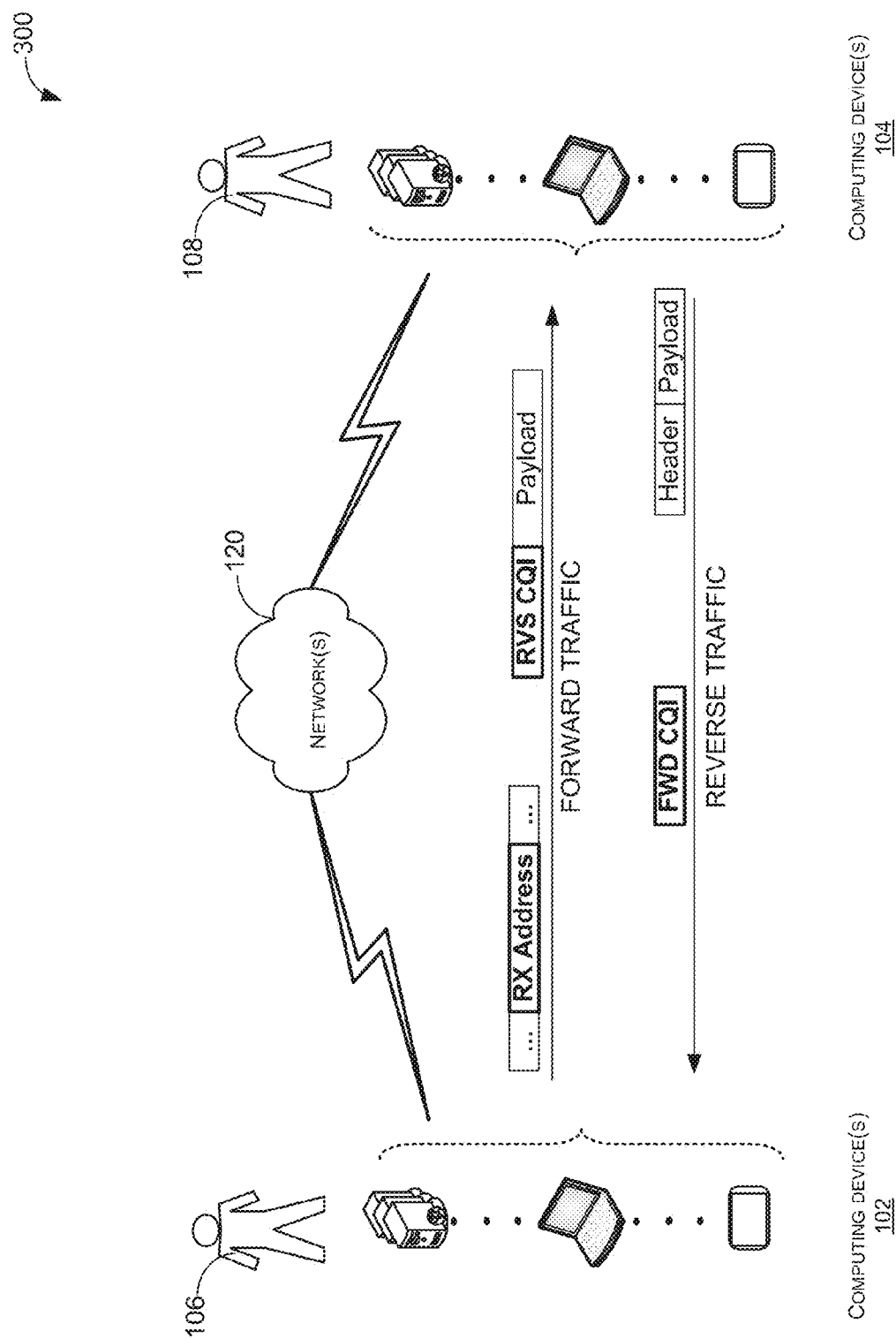
FIG. 3 is an illustrative data flow between components of an illustrative system architecture for a rate adaptation in full-duplex wireless LANs in accordance with one or more embodiments of the disclosure.

FIG. 3 shows an illustrative data flow between components of an illustrative rate adaptation system 300 for a rate adaptation in a full-duplex wireless network in accordance with one or more embodiments of the disclosure.

The rate adaptation system 300 may include one or more computing devices 102 and 104 operable by users 106 and 108, respectively.

As explained in FIG. 1, the receiver (e.g., computing device 104) may send a forward CQI to the transmitter (e.g., computing device 102) as an indication of a channel quality. The transmitter (e.g., computing device 104) may use the forward CQI to select an MCS value that may correspond to a data transmission rate based on the forward CQI received from the receiver (e.g., computing device 104). Subsequent data portions and/or packets and/or messages from the transmitter (e.g., computing device 102) may be sent using the selected MCS.

Additionally/alternatively, when the transmitter (e.g., computing device 102) receives the forward CQI data from the receiver (e.g., computing device 104), the transmitter may determine the quality of the received data, such as noise, interference, transmission errors, etc. and may determine a reverse CQI, which may be sent in the forward traffic direction to the receiver (e.g., computing device 104) in a reverse CQI field. The receiver (e.g., computing device 104) may adjust the data transmission rate of subsequent data portions sent in the reverse data traffic direction based on the MCS value received from the transmitter (e.g., computing device 102).

The receiver (e.g., computing device 104) may select an MCS value that may provide an optimal data transmission rate based on the reverse CQI received from the transmitter (e.g., computing device 102). Any following data portions and/or packets and/or messages from the receiver (e.g., computing device 104) may be sent using the selected MCS value, and/or data transmission rate. The process may repeat such that the transmitter and/or the receiver may select a new MCS value and/or data transmission rate based on the data received by the transmitter and/or the receiver. The process may be triggered when a receiver determines that it is the intended recipient of one or messages sent from a transmitter. The receiver may then return a forward CQI to the transmitter for rate adaptation. Further, when the transmitter receives, data in form of packets or messages, the transmitter may return a reverse CQI to the receiver for rate adaption. Although the process may be triggered when data is sent and/or received by computing devices (e.g., computing devices 102 and 104), other situations may trigger the transmittal of a forward CQI or a reverse CQI. For example, a predetermined timing, where after a certain time a forward CQI and/or a reverse CQI may be transmitted between the computing devices for the purpose of rate adaption. Another example may be transmission errors, lost data, lost signals, low signal to noise ratio, etc.

Figure 4:
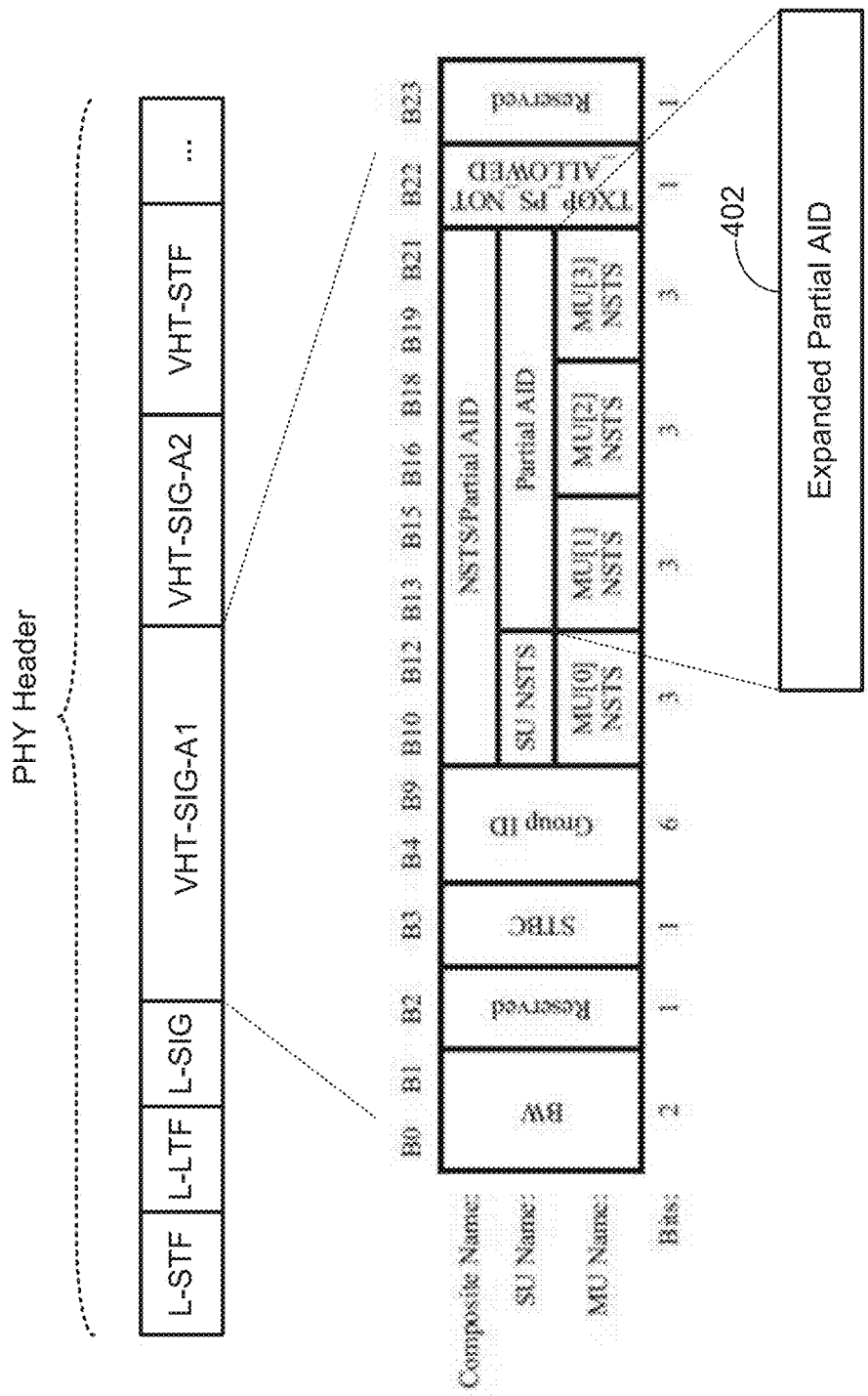
FIG. 4 is an illustrative Physical Layer (PHY) header in accordance with certain example embodiments of the disclosure.

FIG. 4 shows a PHY header information in accordance with one or more embodiments of the disclosure.

In an example illustration, a PHY header defined in the IEEE 802.11ac standards may be used to illustrate the one or more embodiments of the disclosure. It is understood that the IEEE 802.11ac standards are subset of the IEEE 802.11 standards. Although a PHY header as defined in the IEEE 802.11ac standards is used, other PHY headers as defined in other IEEE 802.11 standards may be used.

Typically, a PHY header may be used to relay control information from a transmitter (e.g., computing device 102) to a receiver (computing device 104). It should be appreciated that the PHY header as defined in the IEEE 802.11ac standards may comprise various fields, such as, L-STF, L-LTF, L-SIG, VHT-SIG-A1, VHT-SIG-A2, and VHT-STF, etc.). It is understood that these various fields may be further defined in the IEEE 802.11ac standards or any other IEEE 802.11 standards.

In one embodiment, the VHT-SIG-A field in the PHY header may contain, but not limited to, a Partial AID field. It is understood that the Partial AID field may be a 9 bit field as defined in the IEEE 802.11ac standards. In another embodiment, the PHY header may be modified to form a modified PHY header. The modified PHY header may contain, but not limited to, an expanded Partial AID field (e.g., expanded Partial AID field 402). The expanded Partial AID field 402 may include additional bits that may be used to include information (e.g., RX address) so that a receiver (e.g., computing device 104) may identify itself as the intended receiver of one or more messages sent from the transmitter (e.g., computing device 102). Rate adaptation module 255 of the computing device 104 may receive the expanded Partial AID field in the PHY header and may determine by looking at the additional bits containing the receiver address (e.g., RX address) that computing device 104 is the intended recipient of the PHY header and the possible data portions that may follow the PHY header (e.g., the MAC header and/or the payload). The rate adaptation module 255 may determine the quality of the received data based on factors such as noise, interference, transmission errors, or other factors. The rate adaptation module 255 may determine a forward CQI based on the quality of the received data and may send the forward CQI in the reverse data traffic direction to the computing device 102. The rate adaptation module 225 of the computing device 102, in response to receiving the forward CQI, may select an MCS value based at least in part on the forward CQI to provide an optimal data transmission rate to be used for subsequent data portions sent in the forward data traffic direction.

Referring to FIG. 5, where FIG. 5(a) shows a MAC header and FIG. 5 (b) shows a modified MAC header in accordance with one or more embodiments of the disclosure.

Referring to FIG. 5(a), in an example illustration, a MAC header defined in the IEEE 802.11ac standards may be used to illustrate the one or more embodiments of the disclosure. It is understood that the IEEE 802.11ac standards are subset of the IEEE 802.11 standards. Although a MAC header as defined in the IEEE 802.11ac standards is used, other MAC headers as defined in other IEEE 802.11 standards may be used.

Typically, a MAC header may be used to relay control information from a transmitter (e.g., computing device 102) to a receiver (computing device 104). It should be appreciated that the MAC header as defined in the IEEE 802.11ac standards may comprise various control fields, such as, Frame Control, Duration/ID, Address 1, Address 2, Address 3, Sequence Control, Address 4, QoS Control, and HT Control. It is understood that these various fields may be further defined in the IEEE 802.11ac standards or any other IEEE 802.11 standards.

Referring to FIG. 5(b), in an example embodiment, a modified MAC header may comprise, at least in part, control fields that may depend on the data transmission rate. The data transmission rate dependent control fields may be located towards the end of the end of a MAC header. For example, the Duration/ID field may be moved from the beginning of the MAC header of FIG. 5(*a*) towards the end of the MAC header (e.g., the modified MAC header of FIG. 5(*b*)). The MAC header may contain in one of its fields an address of the destination of the data portions of the packets. For example, in the case where computing device 102 may be sending one or more packets to the computing device 104 in the forward data traffic direction, "Address 1" in FIGS. 5(*a*) and 5(*b*) may contain the address of computing device 104. It is understood that the Duration/ID field may contain information that may be dependent on the MSC selected by the receiver (e.g., computing device 104) based on the received forward CQI. Moving the Duration/ID towards the end of the MAC header (as seen in FIG. 5(*b*), may allow the receiver to receive the address of the recipient of the one or more data portions during data transmission. Doing so may permit the receiver to identify itself as the intended receiver quicker. As explained before, the receiver determines that it is the intended recipient of one or more packets by looking at the recipient address (e.g., Address 1 in the MAC header) in one of the data portions of the one or more packets. The receiver may determine a forward CQI of the received data and may send to the transmitter (e.g., computing device 102) the forward CQI in the reverse data traffic direction. When the receiver determines that it is the recipient of the one or more packets, it may provide feedback on channel quality (e.g., forward CQI) to the transmitter.

Still referring to FIG. 5(*b*) and in another embodiment, the modified MAC header may contain a CQI field that may be placed towards the end of the MAC header of FIG. 5(*a*). The CQI field in the modified MAC header may be used by the transmitter (e.g., computing device 102) to announce the reverse CQI to the receiver (e.g., computing device 104). Any following data portions and/or packets and/or messages from the transmitter (e.g., computing device 102) may be sent using the selected MCS value that may result in a suitable data transmission rate based on the receiver forward CQI.

In another embodiment, an MCS field may be moved from a PHY header to a MAC header. For example, the modified MAC header of FIG. 5(*b*) may contain an MCS field that may be placed towards the end of the MAC header. It is understood that a PHY header as defined in the IEEE 802.11 standards may contain an MCS field that may be part of a VHT-SIG-A2 field. For example, the VHT-SIG-A2 field of the PHY header as defined in the IEEE 802.11ac, may be comprised of various sub-fields. One of the sub-fields may be the MCS field that may be used determine the data transmission rate of the payload portion of a message.

Figure 6:
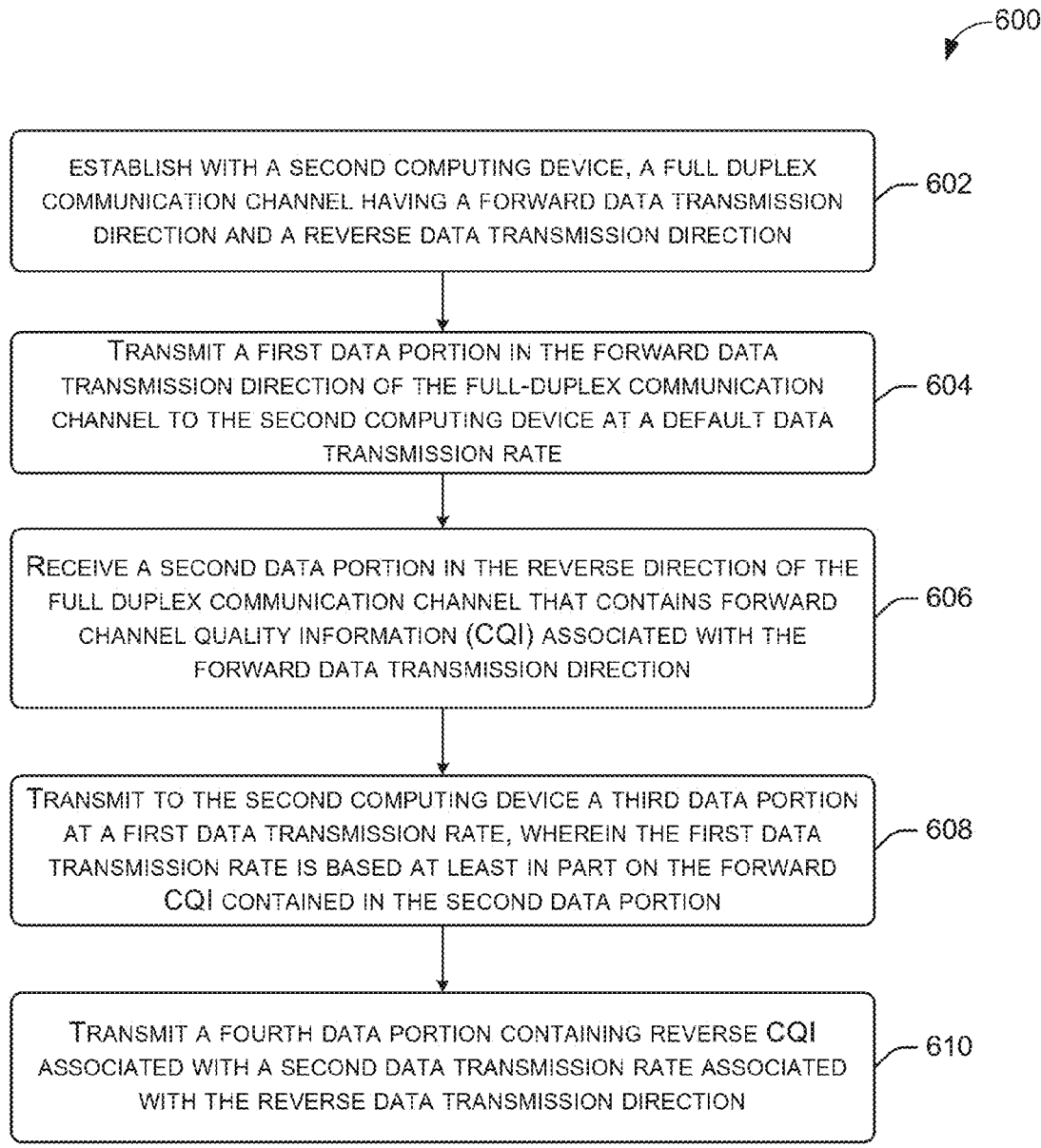
FIG. 6 is a flow diagram of an illustrative process for rate adaptation in full-duplex wireless communications in accordance with one or more embodiments of the disclosure.

FIG. 6 illustrates a flow diagram of illustrative process 600 for a rate adaptation system operating in full-duplex wireless communication in accordance with one or more embodiments of the disclosure.

At block 602, the rate adaptation module 225 may establish a full-duplex communication channel. For example, computing device 102 and computing device 104 may establish a full-duplex wireless communication channel in order to send and receive messages simultaneously. The full-duplex communication channel may have a forward data transmission direction (from computing device 102 to computing device 104) and a reverse data transmission direction (from computing device 104 to computing device 102).

At block 604, the rate adaptation module 225 may transmit a first data portion in the forward data transmission direction of the full-duplex communication channel to the second computing device. For example, the computing device 102 may transmit the header of a message that may contain, control information to computing device 104, which may be followed by the payload of the message. The header may be transmitted at a default data transmission rate that may later be adapted to account for variation in the channel quality.

At block 606, the rate adaptation module 225 may receive one or more data portions in the reverse direction of the full-duplex communication channel that contains forward CQI associated with the forward data transmission direction. For example, the receiver (e.g., computing device 104) may determine that the data portions received in the forward data transmission direction (e.g., from computing device 102) to computing device 104) may contain a forward CQI. The computing device 102 may send the forward CQI to computing device 104. The rate adaptation module 225 may receive the forward CQI and may adjust the data transmission rate of subsequent data portions transmitted from computing device 102 to computing device 104. For example, the MCS value may be selected in order to achieve a relatively optimal data throughput based on the received forward CQI. Once the computing device 102 receives the forward CQI, the computing device 102 may adjust the data transmission rate by selecting an MCS value based on the received forward CQI to be used for subsequently transmitted data portions and/or packets and/or messages.

At block 608, the rate adaptation module 225 may transmit to the second computing device (e.g., computing device 104) a third data portion at the selected MCS value that may be based on the received forward CQI. For example, the rate adaptation module 225 may transmit, subsequent to receiving the forward CQI and selecting an MCS value based on the received forward CQI, data portions at a data transmission rate that is associated with the selected MCS value.

At block 610, optionally, the rate adaptation module 225, may transmit in the forward traffic direction a data portion that may contain a reverse CQI that may be associated with the second computing device (e.g., computing device 104). In other words, when the transmitter (e.g., computing device 102) receives data from the receiver (e.g., computing device 104), the transmitter may determine the quality of that data and may send in the forward traffic direction a reverse CQI to assist the receiver in adjusting its MCS value and/or data transmission rate.

Figure 7:
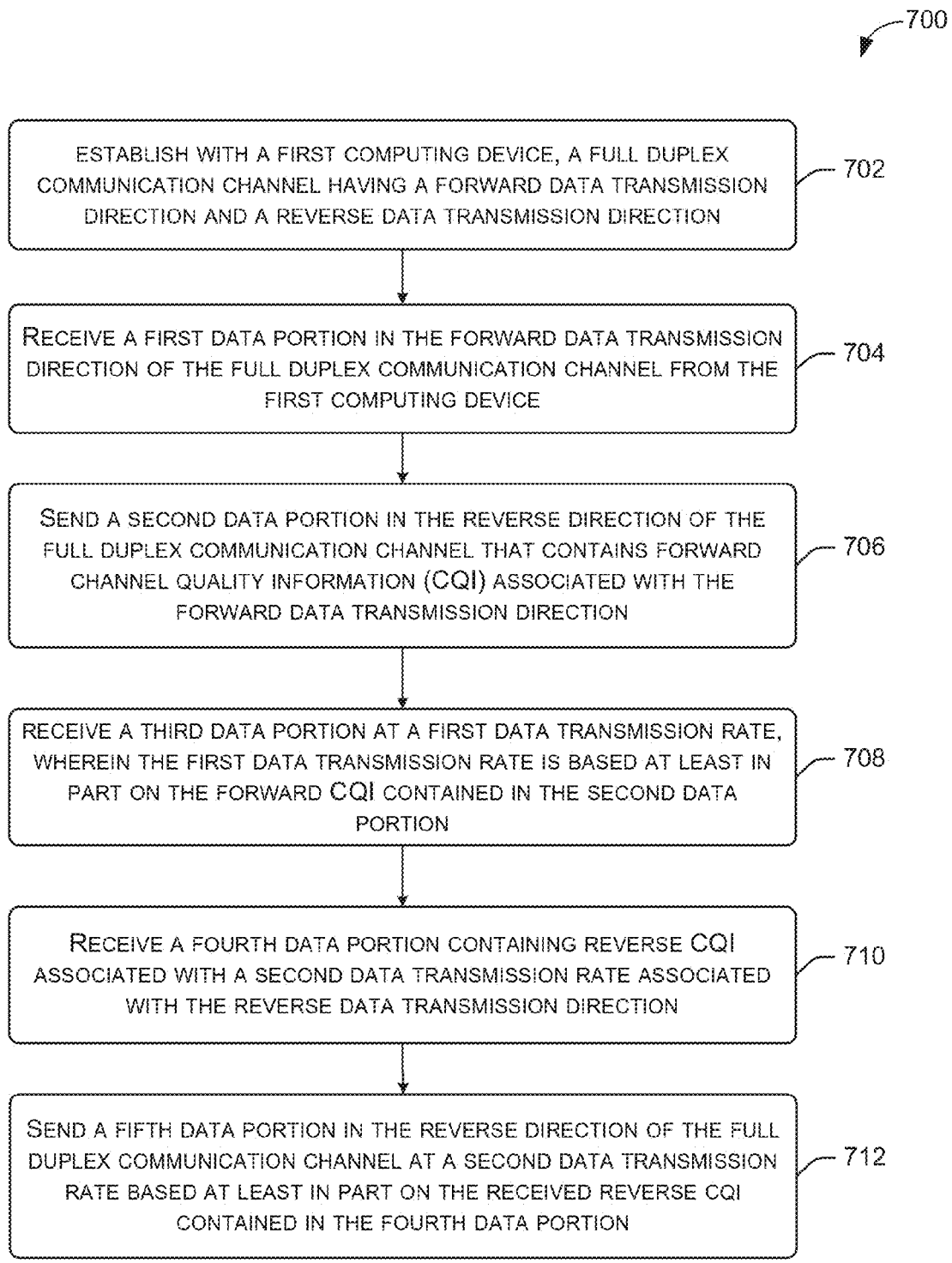
FIG. 7 is a flow diagram of an illustrative process for rate adaptation in full-duplex wireless communications in accordance with one or more embodiments of the disclosure.

FIG. 7 illustrates a flow diagram of illustrative process 700 for a rate adaptation system operating in full-duplex wireless communication in accordance with one or more embodiments of the disclosure.

At block 702, the rate adaptation module 255 may establish a full-duplex communication channel. For example, computing device 102 and computing device 104 may establish a full-duplex wireless communication channel in order to send and receive messages simultaneously. The full-duplex communication channel may have a forward data transmission direction (from computing device 102 to computing device 104) and a reverse data transmission direction (from computing device 104 to computing device 102).

At block 704, the rate adaptation module 255 may receive a first data portion in the forward data transmission direction of the full duplex communication channel from the first computing device. For example, the rate adaptation module 255 may receive the header of a message that may contain, control information to computing device 104, which may be followed by the payload of the message.

At block 706, the rate adaptation module 255 may determine a forward CQI based on the received first data portion. The rate adaptation module 255 may send the forward CQI in the reverse direction of the full-duplex communication channel. The rate adaptation module 255 may send the forward CQI in a second data portion, which may be a standalone packet or may be part of an existing message that may be sent in the reverse data traffic direction.

At block 708, the rate adaptation module 255 may receive a third data portion at a first data transmission rate, wherein the first data transmission rate is based at least in part on the forward CQI contained in the second data portion. For example, the rate adaptation module 255 may receive packets at a data transmission rate that is associated with an MCS value selected by the computing device 102 based on the forward CQI.

At block 710, optionally, the rate adaptation module 255, may receive a fourth data portion containing reverse CQI associated with the reverse data transmission direction. In other words, when the receiver (e.g., computing device 104) sends data to the transmitter (e.g., computing device 102), the transmitter may determine the quality of that data and may send in the forward traffic direction a reverse CQI to assist the receiver in adjusting its MCS value and/or data transmission rate.

At block 715, the rate adaptation module 255 may send a fifth data portion in the reverse direction of the full duplex communication channel at a data transmission rate based at least in part on the received reverse CQI contained in the fourth data portion According to example embodiments of the disclosure, there may be a method. The method may include exchanging channel quality information (CQI) in a wireless network operating in full-duplex. The method may include establishing, by a first computing device including one or more processors and at least one radio component, with a second computing device, a full-duplex communication channel having a forward data transmission direction and a reverse data transmission direction. The method may include transmitting, by the first computing device, a first data portion in the forward data transmission direction of the full-duplex communication channel to the second computing device at a default data transmission rate. The method may include receiving, by the first computing device, a second data portion in the reverse direction of the full-duplex communication channel that contains a forward channel quality information (CQI) associated with the forward data transmission direction. The method may include transmitting, by the first computing device, to the second computing device a third data portion at a first data transmission rate, wherein the first data transmission rate is based at least in part on the forward CQI contained in the second data portion. The forward CQI may be sent in response to include an address of the second computing device in the first data portion and in response to receipt of the address of the second computing device by the second computing device. The method may further include transmitting, by the first computing device, a fourth data portion containing reverse CQI associated with a second data transmission rate associated with the reverse data transmission direction. The third data portion may include a payload information of a message. The method may further include transmitting, by the first computing device, a fourth data portion including a reverse CQI based at least in part on the received second data portion. The fourth data portion that includes the reverse CQI may be sent at the default data transmission rate. The method may further include generating a message that includes in a message header an address of the second computing device. The address of the second computing device may be inserted into a PHY message header.

In example embodiments of the disclosure, there may be a computing device. The computing device may include a transceiver configured to transmit and receive wireless signals, an antenna coupled to the transceiver, one or more processor in communication with the transceiver, at least one memory that stores computer-executable instructions, and at least one processor configured to access the at least one memory, wherein the at least one processor is configured to execute the computer-executable instructions. The one or more processors may be configured to establish with a second computing device, a full-duplex communication channel having a forward data transmission direction and a reverse data transmission direction. The one or more processors may be configured to transmit, by the antenna, a first data portion in the forward data transmission direction of the full-duplex communication channel to the second computing device at a default data transmission rate. The one or more processors may be configured to receive, by the antenna, a second data portion in the reverse direction of the full-duplex communication channel that contains a forward channel quality information (CQI) associated with the forward data transmission direction. The one or more processors may be configured to transmit to the second computing device a third data portion at a first data transmission rate, wherein the first data transmission rate is based at least in part on the forward CQI contained in the second data portion. The forward CQI may be sent in response to an address of the second computing device included in the first data portion and in response to receipt of the address of the second computing device by the second computing device. The one or more processors may be further configured to transmit, by the first computing device, a fourth data portion containing reverse CQI associated with a second data transmission rate associated with the reverse data transmission direction. The third data portion may include a payload information of a message. The one or more processors may be further configured to send, by the first computing device, a fourth data portion including a reverse CQI based at least in part on the received second data portion. The fourth data portion that includes the reverse CQI may be sent at the default data transmission rate. The one or more processors may be further configured to generate a message that includes in a message header an address of the second computing device.

In another example embodiment, there is disclosed one or more computer-readable media storing computer-executable instructions. The one or more computer-readable media may store computer-executable instructions that, when executed by one or more processors, configure the one or more processors to perform a method. The method may include establishing with a second computing device, a full-duplex communication channel having a forward data transmission direction and a reverse data transmission direction. The method may include transmitting a first data portion in the forward data transmission direction of the full-duplex communication channel to the second computing device at a default data transmission rate. The method may include receiving a second data portion in the reverse direction of the full-duplex communication channel that contains a forward channel quality information (CQI) associated with the forward data transmission direction. The method may include transmitting to the second computing device a third data portion at a first data transmission rate, wherein the first data transmission rate is based at least in part on the forward CQI contained in the second data portion. The forward CQI may be sent in response to an address of the second computing device included in the first data portion and in response to receipt of the address of the second computing device by the second computing device. The one or more processors of the one or more computer-readable media may execute the computer-executable instructions to perform the method including transmitting, by the first computing device, a fourth data portion containing reverse CQI associated with a second data transmission rate associated with the reverse data transmission direction. The third data portion may include a payload information of a message. The one or more processors of the one or more computer-readable media may execute the computer-executable instructions to perform the operations including sending, by the first computing device, a fourth data portion including a reverse CQI based at least in part on the received second data portion. The fourth data portion that includes the reverse CQI may be sent at the default data transmission rate.

In example embodiments of the disclosure, there may be a for exchanging channel quality information (CQI) in a wireless network operating in full-duplex system. The system may include at least one memory that store computer-executable instructions, and one or more processors configured to access the at least one memory. The one or more processors may be configured to execute the computer-executable instructions to establish with a second computing device, a full-duplex communication channel having a forward data transmission direction and a reverse data transmission direction. The one or more processors may be configured to transmit a first data portion in the forward data transmission direction of the full-duplex communication channel to the second computing device at a default data transmission rate. The one or more processors may be further configured to receive a second data portion in the reverse direction of the full-duplex communication channel that contains a forward channel quality information (CQI) associated with the forward data transmission direction. The one or more processors may be further configured to transmit to the second computing device a third data portion at a first data transmission rate, wherein the first data transmission rate is based at least in part on the forward CQI contained in the second data portion. The forward CQI may be sent in response to include an address of the second computing device in the first data portion and in response to receipt of the address of the second computing device by the second computing device. The one or more processors may be further configured to transmit a fourth data portion containing reverse CQI associated with a second data transmission rate associated with the reverse data transmission direction. The third data portion may include a payload information of a message. The one or more processors may be further configured to send a fourth data portion including a reverse CQI based at least in part on the received second data portion. The fourth data portion that includes the reverse CQI may be sent at the default data transmission rate. The one or more processors may be further configured to generate a message that includes in a message header an address of the second computing device. The address of the second computing device may be inserted into a PHY message header.

In example embodiments of the disclosure, there may be a for exchanging channel quality information (CQI) in a wireless network operating in full-duplex apparatus. The apparatus may include a means for establishing, by a first computing device including one or more processors and at least one radio component, with a second computing device, a full-duplex communication channel having a forward data transmission direction and a reverse data transmission direction. The apparatus may further include a means for transmitting, by the first computing device, a first data portion in the forward data transmission direction of the full-duplex communication channel to the second computing device at a default data transmission rate. The apparatus may further include a means for receiving, by the first computing device, a second data portion in the reverse direction of the full-duplex communication channel that contains a forward channel quality information (CQI) associated with the forward data transmission direction. The apparatus may further include a means for transmitting, by the first computing device, to the second computing device a third data portion at a first data transmission rate, wherein the first data transmission rate is based at least in part on the forward CQI contained in the second data portion. The forward CQI may be sent in response to a means for including an address of the second computing device in the first data portion and in response to receipt of the address of the second computing device by the second computing device. The apparatus may further include a means for transmitting a fourth data portion containing reverse CQI associated with a second data transmission rate associated with the reverse data transmission direction. The third data portion may include a payload information of a message. The apparatus may further include a means for transmitting a fourth data portion including a reverse CQI based at least in part on the received second data portion. The fourth data portion that includes the reverse CQI may be sent at the default data transmission rate. The apparatus may further include a means for generating a message that includes in a message header an address of the second computing device. The address of the second computing device may be inserted into a PHY message header.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method of exchanging channel quality information (CQI) in a wireless network operating in full-duplex comprising:
    establishing, by a first computing device comprising one or more processors and at least one radio component, with a second computing device, a full-duplex communication channel having a forward data transmission direction and a reverse data transmission direction;
    transmitting, by the first computing device, a first data portion in the forward data transmission direction of the full-duplex communication channel to the second computing device at a default data transmission rate;
    receiving, by the first computing device, a second data portion in the reverse direction of the full-duplex communication channel that contains a forward channel quality information (CQI) associated with the forward data transmission direction; and
    transmitting, by the first computing device, to the second computing device a third data portion in the forward data transmission direction of the full-duplex communication channel at a first data transmission rate, wherein the first data transmission rate is based at least in part on the forward CQI contained in the second data portion.

2. The method of claim 1, wherein the forward CQI is sent in response to an address of the second computing device included in the first data portion and in response to receipt of the address of the second computing device by the second computing device.

3. The method of claim 1, further comprising transmitting, by the first computing device, a fourth data portion containing reverse CQI associated with a second data transmission rate associated with the reverse data transmission direction.

4. The method of claim 1, wherein the third data portion comprises a payload information of a message.

5. The method of claim 1, further comprising transmitting, by the first computing device, a fourth data portion including a reverse CQI based at least in part on the received second data portion.

6. The method of claim 5, wherein the fourth data portion that comprises the reverse CQI is sent at the default data transmission rate.

7. The method of claim 1, further comprising generating a message that includes in a message header an address of the second computing device.

8. The method of claim 7, wherein the address of the second computing device is inserted into a PHY message header.

9. A computing device, comprising:
    a transceiver configured to transmit and receive wireless signals;
    an antenna coupled to the transceiver;
    one or more processor in communication with the transceiver;
    at least one memory that stores computer-executable instructions; and
    at least one processor configured to access the at least one memory, wherein the at least one processor is configured to execute the computer-executable instructions to:
        establish with a second computing device, a full-duplex communication channel having a forward data transmission direction and a reverse data transmission direction;
        transmit, by the antenna, a first data portion in the forward data transmission direction of the full-duplex communication channel to the second computing device at a default data transmission rate;
        receive, by the antenna, a second data portion in the reverse direction of the full-duplex communication channel that contains a forward channel quality information (CQI) associated with the forward data transmission direction; and
        transmit to the second computing device a third data portion in the forward data transmission direction of the full-duplex communication channel at a first data transmission rate, wherein the first data transmission rate is based at least in part on the forward CQI contained in the second data portion.

10. The computing device of claim 9, wherein the forward CQI is sent in response to an address of the second computing device included in the first data portion and in response to receipt of the address of the second computing device by the second computing device.

11. The computing device of claim 9, wherein the at least one processor is further configured, in response to execution of the instructions, to transmit a fourth data portion containing reverse CQI associated with a second data transmission rate associated with the reverse data transmission direction.

12. The computing device of claim 9, wherein the third data portion comprises a payload information of a message.

13. The computing device of claim 9, further including sending a fourth data portion including a reverse CQI based at least in part on the received second data portion.

14. The computing device of claim 13, wherein the fourth data portion that comprises the reverse CQI is sent at the default data transmission rate.

15. The computing device of claim 9, wherein the at least one processor is further configured, in response to execution of the instructions, to generate a message that includes in a message header an address of the second computing device.

16. A non-transitory computer-readable medium storing computer-executable instructions which, when executed by a processor, cause the processor to perform operations comprising:
    establishing with a second computing device, a full-duplex communication channel having a forward data transmission direction and a reverse data transmission direction;
    transmitting a first data portion in the forward data transmission direction of the full-duplex communication channel to the second computing device at a default data transmission rate;
    receiving a second data portion in the reverse direction of the full-duplex communication channel that contains a forward channel quality information (CQI) associated with the forward data transmission direction; and
    transmitting to the second computing device a third data portion in the forward data transmission direction of the full-duplex communication channel at a first data transmission rate, wherein the first data transmission rate is based at least in part on the forward CQI contained in the second data portion.

17. The non-transitory computer-readable medium of claim 16, wherein the forward CQI is sent in response to an address of the second computing device included in the first data portion and in response to receipt of the address of the second computing device by the second computing device.

18. The non-transitory computer-readable medium of claim 16, further comprising transmitting, by the first computing device, a fourth data portion containing reverse CQI associated with a second data transmission rate associated with the reverse data transmission direction.

19. The non-transitory computer-readable medium of claim 16, wherein the third data portion includes a payload information of a message.

20. The non-transitory computer-readable medium of claim 16, further including sending, by the first computing device, a fourth data portion including a reverse CQI based at least in part on the received second data portion.

21. The non-transitory computer-readable medium of claim 20, wherein the fourth data portion that includes the reverse CQI is sent at the default data transmission rate.

* * * * *